(12) United States Patent
Obara et al.

(10) Patent No.: US 6,273,615 B1
(45) Date of Patent: Aug. 14, 2001

(54) RETAINER FOR A BEARING AND A BALL BEARING

(75) Inventors: Rikuro Obara; Hirotaka Yajima, both of Miyota-machi (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 09/419,970

(22) Filed: Oct. 18, 1999

(30) Foreign Application Priority Data

Jul. 14, 1999 (JP) .................................................. 11-200327

(51) Int. Cl.[7] .............................. F16C 33/38; F16C 33/44
(52) U.S. Cl. ............................................. 384/523; 384/526
(58) Field of Search .................................... 384/523, 526, 384/527, 531, 532, 533

(56) References Cited

U.S. PATENT DOCUMENTS

| | | | | |
|---|---|---|---|---|
| 2,038,095 | * | 4/1936 | Bott ....................................... | 384/527 |
| 3,486,212 | * | 12/1969 | Vannest ............................. | 384/523 X |
| 3,749,461 | * | 7/1973 | Liss et al. ............................. | 384/527 |
| 4,136,915 | * | 1/1979 | Derner ................................. | 384/526 |
| 4,225,199 | * | 9/1980 | Earsley ................................. | 384/470 |
| 4,963,040 | * | 10/1990 | Takebayashi et al. ........... | 384/527 X |
| 5,539,844 | * | 7/1996 | Tazumi et al. ........................ | 384/531 |
| 5,553,949 | * | 9/1996 | Fukuwaka et al. .................. | 384/523 |
| 6,068,408 | * | 5/2000 | Mutoh et al. ........................ | 384/523 |
| 6,074,099 | * | 6/2000 | Mutou et al. ........................ | 384/523 |

FOREIGN PATENT DOCUMENTS

| | | | | |
|---|---|---|---|---|
| 488166 | * | 7/1938 | (GB) | ................................... 384/526 |
| 580286 | * | 9/1946 | (GB) | ................................... 384/526 |
| 7-208482 | | 8/1995 | (JP) . | |

* cited by examiner

Primary Examiner—Charles A Marmor
Assistant Examiner—Roger Pang
(74) Attorney, Agent, or Firm—Oliff & Berridge, PLC

(57) ABSTRACT

The ball rolling surfaces 11 and 12 of the pocket 7 holding the ball 5 are set in the two spherical surfaces which have a radius larger than the one of the ball 5 and the centers of which are deflected at an equal space from the center of the pocket on the pitch circle of the pocket disposing, and on the inside portions from the edge 9a of the width direction of the pocket and the edge 9b of the height direction of the pocket the contact portions 14 and 15 where the rolling surfaces of the balls and the balls which are positioned at the displacing end contact to form the gaps 16 and 17 on the area determined from the contact portions 14 and 15 to the edge side and make the lubricant G entered through the gaps 16 and 17 into the ball rolling surfaces 11 and 12.

5 Claims, 4 Drawing Sheets

RETAINER FOR A BEARING AND A BALL BEARING

BACKGROUND OF THE INVENTION

1. Field of the Invention

The present invention relates to a retainer for balls to be used for a rolling bearing in particular a ball bearing provided with such retainer.

2. Related Art

As shown in FIG. 3, normally in a ball bearing, a plurality of balls 5 are interposed between a raceway surface 2 of an inner ring 1 and a raceway surface 4 of an outer ring 3 and these balls 5 are kept at an even spacing and circumferential by a retainer 6. Conventionally, a crown shape type retainer, provided with a plurality of pockets 7 to hold the plurality of aforesaid balls 5 at even spacing and circumferential, has often been used as the retainer 6 for such a ball bearing. For reference, in FIG. 4, W designates a thickness of the retainer 6 in the direction of the ball and H designates a height of the retainer 6 in an axial direction of a shaft to be received by this ball bearing, which are called hereinafter W direction and H direction respectively.

In this crown type retainer, the ball rolling surface 8 in the pocket 7, as shown in FIG. 5 showing a conventional manner, has a radius $R_R$ larger than the radius $R_B$ of the ball 5 and is set on the spherical surface of another sphere surface having its center on the $O_o$ which is the center of the pocket 7, accordingly between the ball rolling surface 8 and the ball 5 held in the pocket 7, there is adapted to set a predetermined gap 2δ normally.

By the way, in the above ball bearing, in order to increase a revolution precision, prevent a surface coarsening, diminish a friction heat, control a vibration and control a wearing, after assembling a bearing, a lubricant such as a grease is adapted to be furnished on the ball rolling surface 8 and the raceway surfaces 2, 4 of the inner and outer ring 1 and 3.

However, according to the above conventional retainer 6, the ball rolling surface 8 is settled in one spherical surface; as shown in FIG. 6, when, after the ball 5 is displaced in the W direction by Δ X or in the H direction by Δ Y, and a further displacement of the ball 5 is limited, the ball 5 has fallen in a state where it becomes tightly to get in touch with an edge 9a of the width W direction of the pocket 7 or and edge 9b (see FIG. 6 too) of the H direction of the pocket 7 (wedgewise), thereby, as shown in FIG. 6, the lubricant is prevented from entering the ball rolling surface 8, and there occurs a phenomenon where the lubricant G deposits outside the edges 9a, 9b.

And, when such phenomenon is generated, between the ball rolling surface 8 and the ball 5 and the ball 5 and the raceway surfaces 2, 4 of the inner, outer rings, so called a grease deficiency state is generated, which invites first not only a deterioration of revolution precision, but also an increase of surface coarsening, friction heating, vibration and wearing to decrease the bearing property as well as to reduce the life of bearing.

SUMMARY OF THE INVENTION

The present invention has been made to solve the above problem, and an object of which is to provide a retainer which ensures the lubricant to enter smoothly the ball rolling surface to contribute greatly for maintaining the stable bearing property and prolonging the bearing life, and to provide a rolling bearing using this retainer.

In order to attain the above object the retainer relating to the present invention, in a retainer having a plurality of pockets to hold a plurality of rolling element at an equal spacing in the circumferential direction on one circumferential edge, in an inside portion of the ball rolling surface provided in the pocket from the edge which is determined from both of the width and height direction of the pocket, a ball contact portion to prevent the ball displacement is provided to form a gap between the ball rolling surface which is located near to the edge side and the ball prevented to be displaced.

In the rolling bearing thus constructed with the retainer, during using, the lubricant can enter smoothly the ball rolling surface making use of the gap between the ball rolling surface of the pocket and the ball.

The ball rolling surface in the present invention can be formed from two spherical surfaces having a diameter larger than the one of the ball, the centers of which are located on the pitch circle of the pocket and are separated from each other, and the two ball rolling surfaces in the two spherical surfaces can form by being connected at the bottom of the pockets. By thus forming, between the edge side portion of the ball supporting portion and the ball, a gap is easily formed.

In this case, at the connecting portion of the two spherical surfaces a flat portion parallel to another circumference edge opposite to the edge where the pocket is be provided, and thereby, a thickness of the pocket is increased to become advantageous from the view point of strength.

DETAILED DESCRIPTION OF PREFERRED EMBODIMENT

Figure 1:
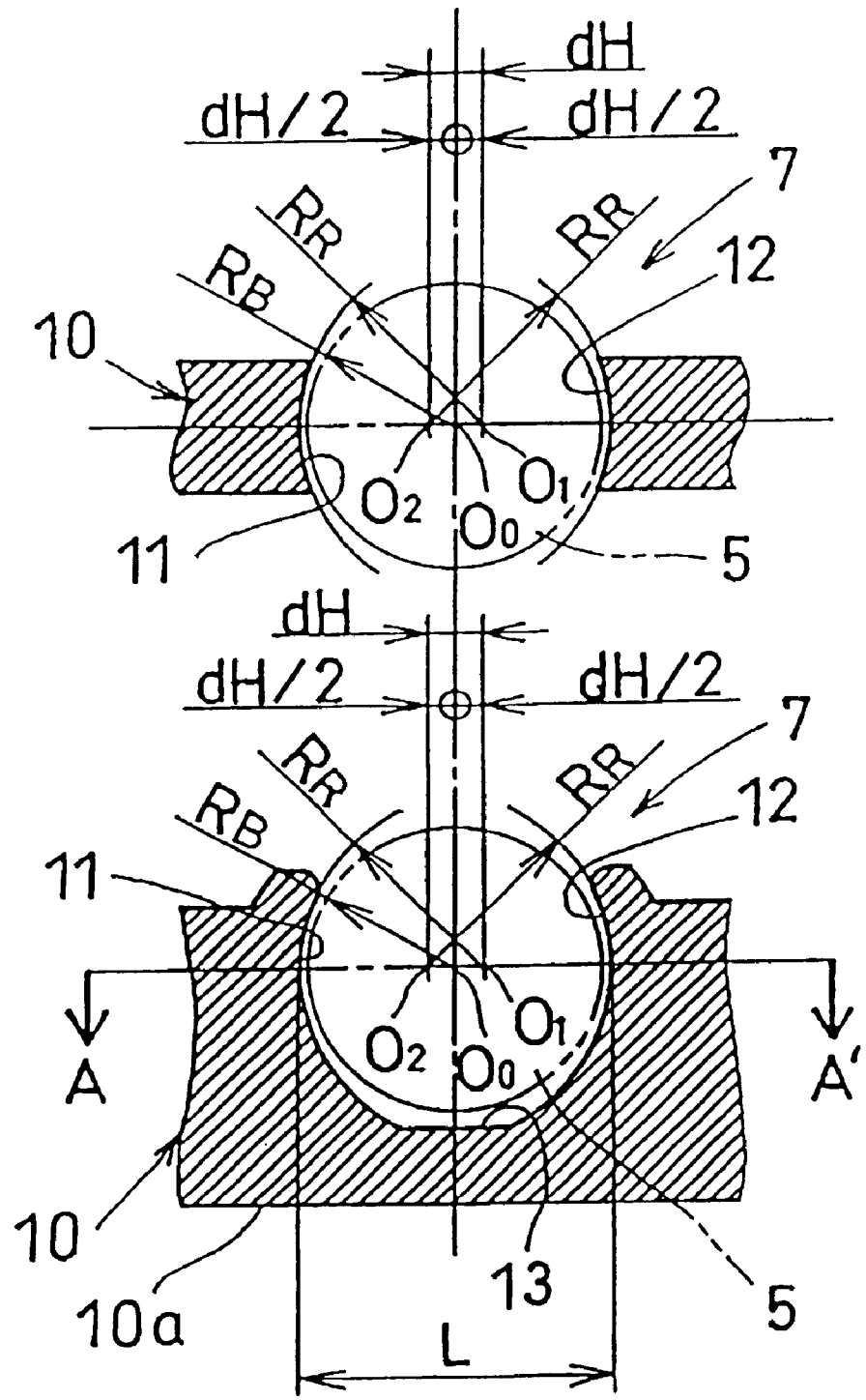
FIG. 1 shows a structure of the pocket portion for the retainer for bearing of the present invention, the lower figure shows a vertically sectional view through the center thereof and the upper figure shows a laterally sectional view along the arrow line A–A' of the lower figure.
Figure 2:
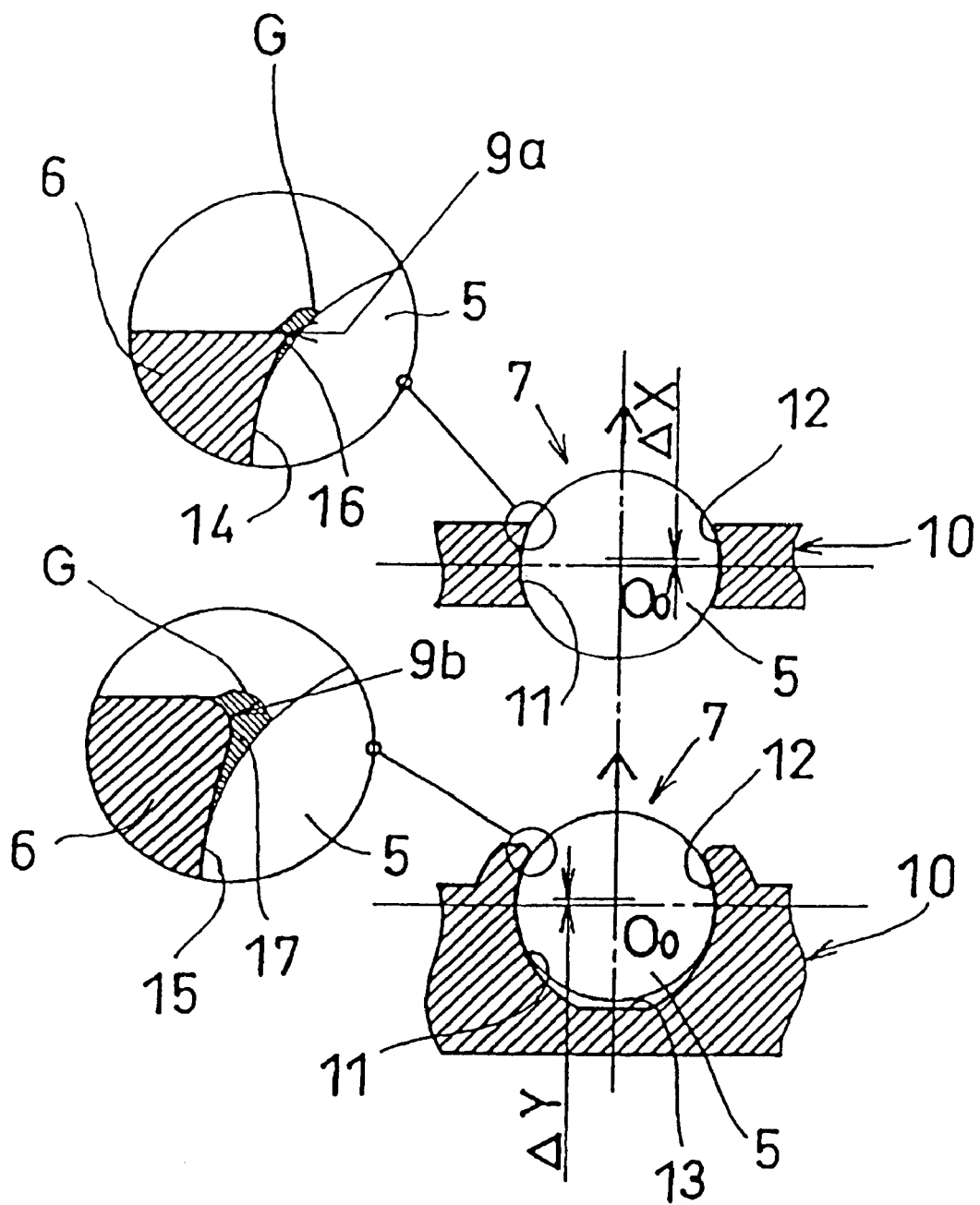
FIG. 2 is to show the state where a gap is generated, and as well as in FIG. 1, vertically and laterally sectional view of the retainer in which the ball is accommodated.
Figure 4:
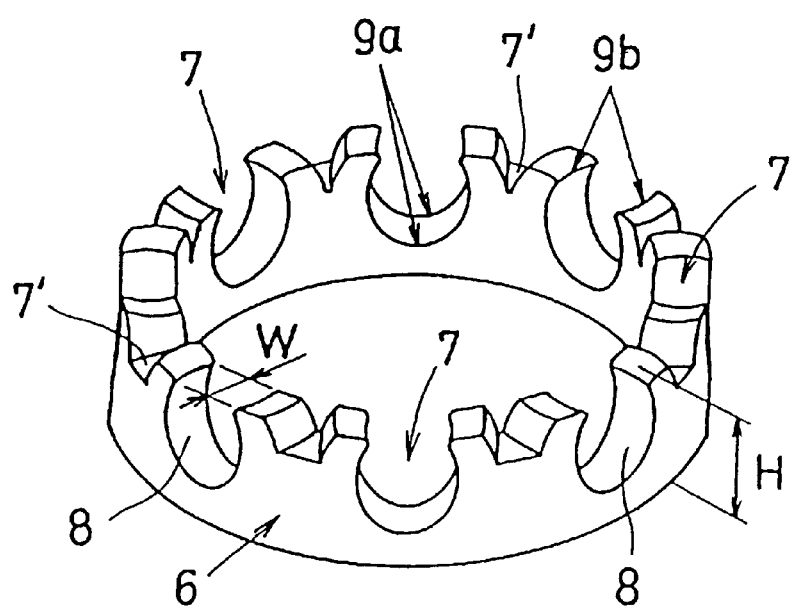
FIG. 4 is a perspective view showing whole construction of the retainer.
Figure 5:
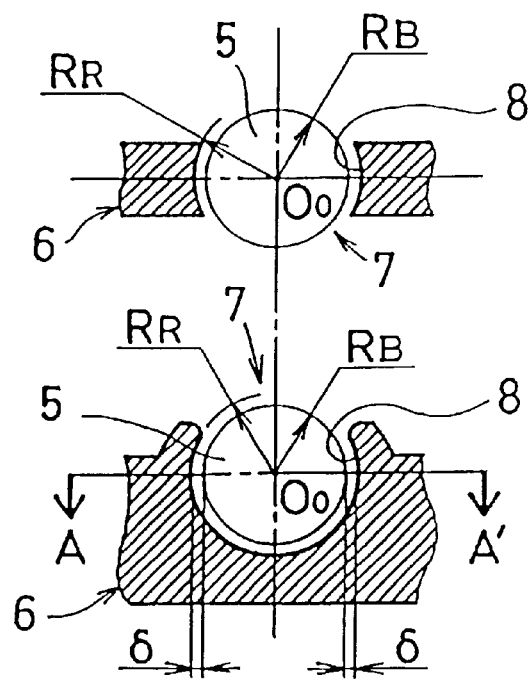
FIG. 5 shows a structure of the pocket portion for the retainer for bearing of the present invention, the lower figure shows a vertically sectional view through the center thereof and the upper figure shows a laterally sectional view along the arrow line A–A' of the lower figure.
Figure 6:
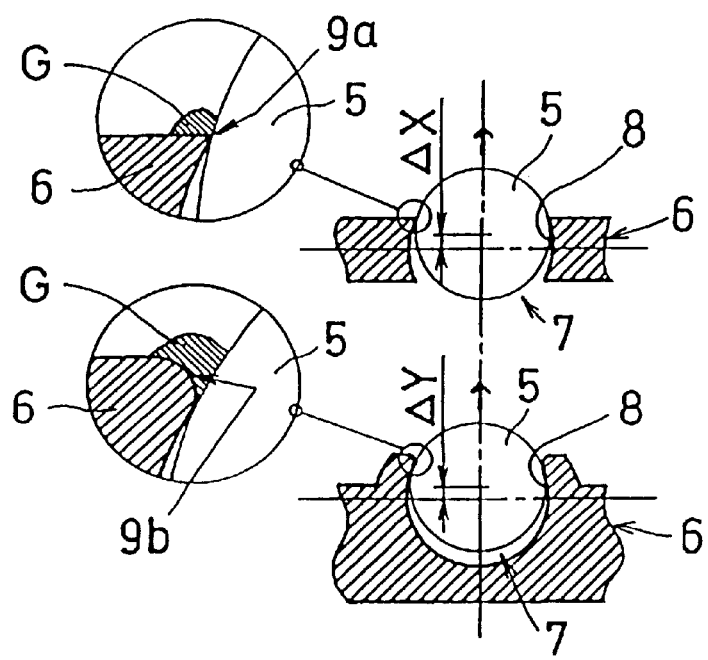
FIG. 6 shows a conventional retainer in which a gap between a ball rolling surface and a ball is generated, which is a vertically and laterally sectional view as well as FIG. 4.

Hereinafter, an embodiment of the present invention is explained based on the attached drawing. FIGS. 1 and 2 show an embodiment of the present invention that is a retainer for a ball bearing. For reference, the whole structure of the retainer 10 are identical with what is shown in FIG. 4, so that here only primary portion is shown and the identical reference numerals are attached to the identical portion to FIG. 4. In the present embodiment, the ball rolling surface in the pocket 7 which holds a plurality of balls 5 circumferentially in the W direction at predetermined spacing, comprises of two rolling surfaces 11, 12. And, these two rolling surfaces 11, 12 are at the bottom of the pocket 7 connected with through a flat surface 13 which is parallel with the other edge face 10a opposite to the edge portion where the pockets are provided. For reference, the manufacturing method of the present invention is of a free selection, which may include not only a resin molding, but also sintering method, in which a sintering material is sintered and molded and a pressing molding method is carried out by pressing the steel.

Here, the above two ball rolling surface 11, 12 are set in the two spherical surfaces which has a radius $R_R$ larger than $R_B$ of radius of the ball 5 and the centers $O_1$ and $O_2$ deviated equally by dH/2 from the center $O_0$ of the pocket on the pitch circle of the pocket 7 and separated each other. In this case, an opposing distance L (FIG. 1) of the two rolling surfaces is given by the following equation, $$L=2R_R-dH$$

wherein said deflection amount dH/2 is settled in such a manner as the opposing distance L becomes a little larger than the diameter $[2R_B]$ of the ball.

By settling thus the deflection amount (dH/2) of the two rolling surfaces 11 and 12, as shown in FIG. 2, on an inside portion from the edge 9a of the W direction of the pocket 7, and on an inside portion from the edge 9b of the H direction of the rolling surface 11, 12 respectively, contacting portions 14, 15 to limit the ball's displacement are adapted to be settled, so that, between the ball rolling surfaces 11 and 12 of the edge sides 5 and 6, from the contact portion 14, 15 and ball 5 to be limited in displacing, an approximately triangle gap 16, 17 in section is formed.

Figure 3:
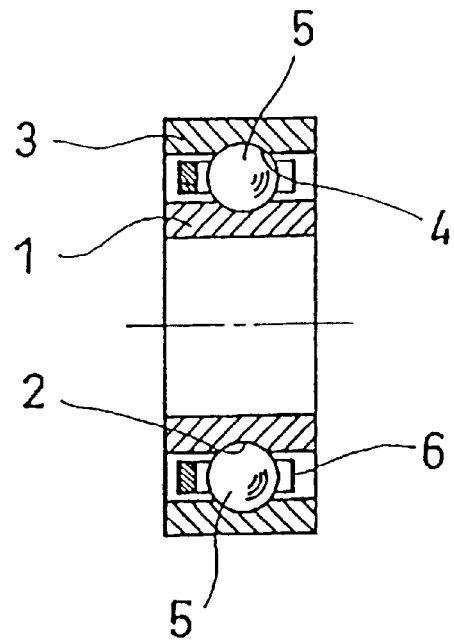
FIG. 3 is a sectional view of a ball bearing which is assembled with a ball retainer.

In assembling the retainer 10 to the ball bearing (FIG. 3), a necessary number of balls 5 are assembled between the raceway surface 2 of the inner ring 1 and the raceway surface 4 of the outer ring 3, then between the inner ring 1 and the outer ring 3 the retainer 10 is adapted to be pushed in from the one end side, in accordance with this pushing in each ball 5 is accommodated in each pocket 7 of the retainer 10. And after this assembling, from the opening opposite to the opening where the retainer 10 is pushed in, a lubricant G such as a grease is supplied on the tip opening portion of the pocket and mutual connecting portion 7' (FIG. 4) of the pocket 7. Then, this lubricant G is supplied in accordance with the rolling of the ball 5 during using to the ball rolling surface 11, 12 of the pocket 7 of the retainer 10 and to the raceway surfaces 2, 4.

Thereby, in the example of the present invention, during using as a ball bearing, although the ball 5 is in the state where its displacement is limited by displacing by the amount of ΔX in the W direction or ΔY in the H direction, since the near the edge 5 of the pocket 7 in the width ΔX direction or near the edge 6 of the pocket 7 in the height ΔY direction, the gaps 16, 17 are formed, the lubricant 7 is flown smoothly through these gaps 16, 17 to each of the ball rolling surface 11, 12, and through the ball 5 is supplied to the raceway surfaces 2, 4 of the inner, outer ring. That is, between the ball rolling surfaces 11, 12 and the ball 5, between the ball 5 and the raceway surfaces 2, 4 of the inner and outer rings, there may occur no deficiency of the grease, at a result, not only the deterioration of the revolution precision as a rolling bearing but also the increase of the surface coarsening, the friction heating, vibration and wearing are controlled. Accordingly, the ball bearing which is assembled by the present retainer 10, has become suitable for, for instance, a field in which the spindle motor to be used for driving a hard disc of a computer and required for a highly tranquil revolution. Further, recently, as a rolling bearing which is used for this kind of spindle motor, it has been used wherein an outer ring and a sleeve are combined in a unitary manner, the present retainer 10 may play the same effect if it is assembled therein, further its applicable field may be increased more than before.

In addition, in the present embodiment, the bottom portion of the pocket 7 is provided with a flat portion 13, so that the thickness of the flat portion is increased as a result, the strength is also sufficiently guaranteed.

As explained above, according to the retainer for bearing and the roller bearing applied with the retainer, the smooth supply of the lubricant not only to the ball rolling surface but also to the raceway surfaces of the inner and outer ring becomes possible, not only the deterioration of the revolution precision as the rolling bearing is controlled but also the increase of the surface coarsening, friction heating, vibration and wearing and so on are controlled to attain the stable maintaining of the bearing property and the prolongation of the life of the bearing.

What is claimed is:

1. A retainer for a rolling bearing formed in an annular and having a plurality of pockets opened to one side in an axial direction of the retainer, the pockets formed on circumferential equally arranged positions to hold a ball, each of the pockets having two ball rolling surfaces in a circumferential direction of the retainer, a bottom surface facing an opening portion of the pockets having a flat surface orthogonal to the axial direction, the two ball rolling surfaces being spherical surfaces each having a radius of curvature larger than a radius of curvature of the ball, and each of centers of curvature of the two ball rolling surfaces is equally displaced from a center of the pockets to opposite circumferential directions.

2. The retainer for the rolling bearing according to claim 1, wherein the two ball rolling surfaces are connected with the bottom surface.

3. The retainer for the rolling bearing according to claim 1, wherein the retainer is assembled within the rolling bearing.

4. The retainer for the rolling bearing according to claim 3, wherein the rolling bearing is a ball bearing.

5. The retainer for the rolling bearing according to claim 1, wherein the retainer is a crown type retainer.

* * * * *